United States Patent
Stipes et al.

(10) Patent No.: US 6,348,169 B1
(45) Date of Patent: Feb. 19, 2002

(54) METHOD OF MAKING A DUAL DUROMETER WATER SHIELD

(75) Inventors: Brian Matthew Stipes, Sterling Heights; Douglas Howard Turner, Troy, both of MI (US)

(73) Assignee: Cadillac Products, Inc., Troy, MI (US)

( * ) Notice: Subject to any disclaimer, the term of this patent is extended or adjusted under 35 U.S.C. 154(b) by 0 days.

(21) Appl. No.: 09/300,938

(22) Filed: Apr. 28, 1999

(51) Int. Cl.$^7$ .............................................. B29C 45/16
(52) U.S. Cl. .................. 264/255; 29/397.2; 264/297.3; 264/328.7; 264/328.8
(58) Field of Search .......................... 264/1.7, 2.1, 245, 264/246, 247, 255, 328.7, 328.8, 297.3; 425/116, 129.1; 29/397.2

(56) References Cited

U.S. PATENT DOCUMENTS

| | | | |
|---|---|---|---|
| 3,471,900 A | 10/1969 | Burns | |
| 3,542,328 A | 11/1970 | Deitrick | |
| 3,678,635 A | * 7/1972 | Vagi et al. | |
| 3,840,627 A | 10/1974 | Rhodes | |
| 4,035,466 A | 7/1977 | Langecker | |
| 4,081,879 A | 4/1978 | Rubright | |
| 4,715,802 A | 12/1987 | Arai | |
| 4,765,673 A | 8/1988 | Frabotta et al. | |
| 4,856,795 A | 8/1989 | DeLano et al. | |
| 4,873,132 A | 10/1989 | Jones et al. | |
| 4,885,121 A | * 12/1989 | Patel | 264/328.8 |
| 4,954,307 A | 9/1990 | Yokoyama | |
| 4,957,803 A | 9/1990 | Foley | |
| 4,961,713 A | 10/1990 | McCracken et al. | |
| 5,074,771 A | 12/1991 | Thakrar et al. | |
| 5,178,927 A | 1/1993 | Turner | |
| 5,182,032 A | 1/1993 | Dickie et al. | |
| 5,275,546 A | 1/1994 | Fierkens | |
| 5,296,068 A | 3/1994 | Turner | |
| 5,316,463 A | 5/1994 | Neu | |
| 5,322,722 A | 6/1994 | Rozenberg | |
| 5,344,601 A | 9/1994 | Newton | |
| 5,374,176 A | 12/1994 | Jang | |
| 5,409,779 A | 4/1995 | Puckett et al. | |
| 5,482,343 A | 1/1996 | Bradac | |
| 5,530,989 A | 7/1996 | Remmert et al. | |
| 5,582,789 A | 12/1996 | Stein et al. | |
| 5,588,260 A | 12/1996 | Suzuki et al. | |
| 5,656,215 A | 8/1997 | Eckardt et al. | |
| 5,659,924 A | 8/1997 | Gildersleeve | |
| 5,688,015 A | 11/1997 | Patterson et al. | |
| 5,735,041 A | 4/1998 | Zaguskin et al. | |
| 5,823,069 A | 10/1998 | Roark et al. | |
| 5,857,244 A | * 1/1999 | Edwards et al. | |
| 5,902,004 A | 5/1999 | Waltz et al. | |
| 5,904,618 A | * 5/1999 | Lewis | |
| 5,975,622 A | 11/1999 | Koopman, Jr. | |
| 6,000,814 A | * 12/1999 | Nestell et al. | |

OTHER PUBLICATIONS

Article entitled "Choosing a Multi-Material Molding Process," Jan. 1998—Molding Systems.

* cited by examiner

Primary Examiner—Mathieu D. Vargot
(74) Attorney, Agent, or Firm—Harness, Dickey & Pierce, P.L.C.

(57) ABSTRACT

A method of making a water shield for a motor vehicle. The method comprises providing a mold having a cavity with the general shape of the water shield and also having a movable core. A first plastic is injected into the cavity to form a substrate of the water shield. The core is withdrawn, and a second plastic is injected into the mold in proximate the first plastic to form a gasket of the water shield. The plastics are cooled to form the substrate having a first durometer and to form the gasket having a second durometer softer than the first durometer.

29 Claims, 2 Drawing Sheets

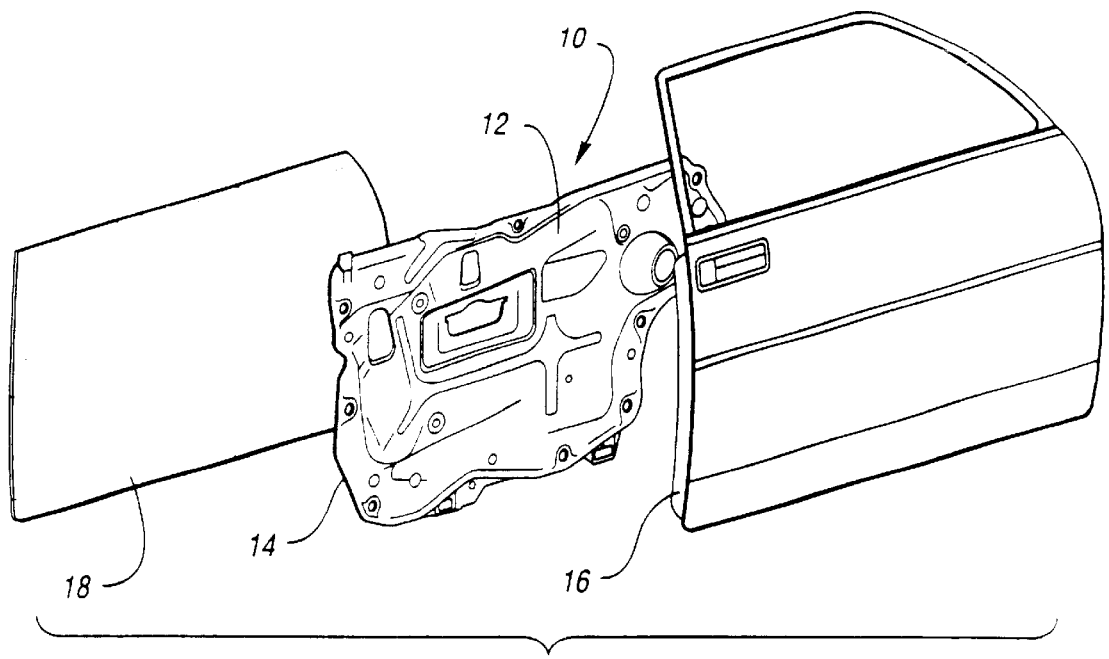
Fig. 1
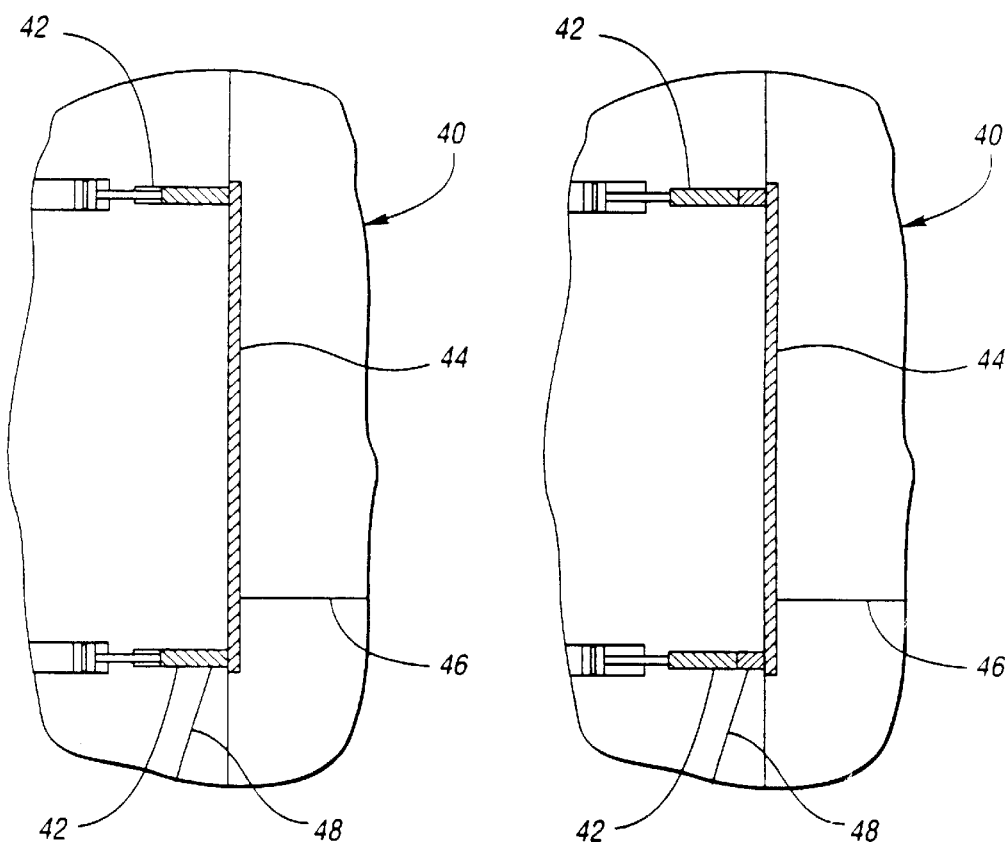
Fig. 2      Fig. 3

METHOD OF MAKING A DUAL DUROMETER WATER SHIELD

TECHNICAL FIELD

This invention relates to water shields for motor vehicle doors, and more particularly to a rigid, injection molded water shield and seal.

BACKGROUND ART

Doors for motor vehicles normally have openings through which components such as door locks and handles are mounted. In order to prevent water from penetrating from the outside of the door through the door openings, water shields are typically provided. Often such water shields are formed from a flexible membrane. For example, U.S. Pat. No. 4,957,803 shows a water deflector with wire harness seal. During application of a flexible water shield to the vehicle door, however, problems often arise with proper orientation of the water shield and completing its seal with the door.

Rigid water shields are also known, and have fewer orientation problems because they are frequently equipped with built-in retainer clips that mate with predetermined locations on the door. However, forming rigid water shields presents certain problems. Principally, a seal must be applied to the rigid water shield in a costly and time-consuming secondary operation.

SUMMARY OF THE INVENTION

The present invention is a method of forming a water shield for a motor vehicle. The method comprises providing a mold having the general shape of the water shield and also having a movable core, and injecting into the mold a first plastic to form a substrate of the water shield. The core is then withdrawn, and a second plastic is injected in a continuous, closed loop bead into the mold and proximate the first plastic. The plastics are cooled to form a substrate having a first durometer and to form a sealing gasket having a second durometer softer than the first durometer.

Accordingly, an object of this invention is to provide a method of the type described above which provides a seal and a rigid water shield in the same molding operation.

Another object of this invention is to provide a method of the type described above which allows application of the water shield to the vehicle door with decreased chance for operator application error.

Still another object of this invention is to provide a water shield formed by the method described above.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is an exploded perspective view of a motor vehicle door including a water shield according to the present invention;

FIG. 2 is a schematic cross-sectional view of a mold for forming the water shield showing a movable core in an extended position;

FIG. 3 is a schematic cross-sectional view of the mold showing the movable core in a retracted position.

BEST MODE FOR CARRYING OUT THE INVENTION

Figure 4:
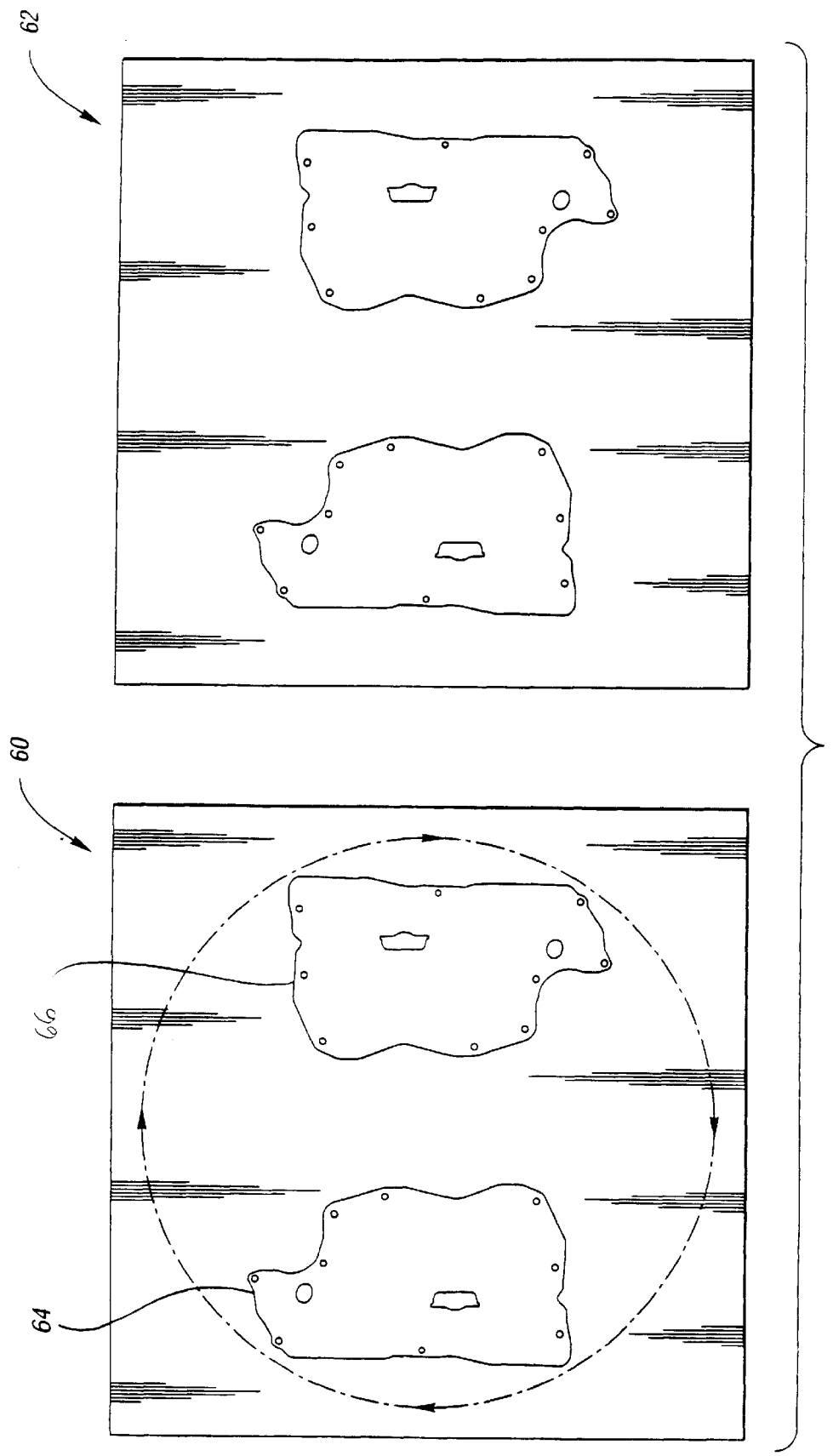
FIG. 4 is a schematic view of a rotary mold showing an alternative method for making the water shield.

With reference to the drawings, the preferred embodiments of the present invention will be described. FIG. 1 shows a water shield or deflector 10 formed according to the present invention. The water shield 10 includes a rigid plastic substrate 12 and a relatively flexible sealing gasket 14 disposed proximate a periphery of the substrate. When attached to a motor vehicle door outer 16 between the door outer and an interior trim panel 18, the water shield 10 inhibits the passage of water, sound, air and dirt from outside of the door outer through the water shield. Further details of this purpose may be found in U.S. Pat. No. 5,409,779 entitled Shield For Water And Sound, the disclosure of which is hereby incorporated by reference.

The water shield 10 is preferably formed according to a method shown in FIGS. 2 and 3. The method comprises providing a mold 40 having a cavity with the general shape of the water shield 10. The mold 40 also has a movable core 42. With the movable core 42 in an extended position as shown in FIG. 2, a first molten plastic 44 is injected through one or more gates 46 and into the mold 40 to form the substrate 12 of the water shield 10. The first plastic preferably comprises acrylonitrile butadiene styrene (ABS) or a molten thermoplastic.

After allowing the first plastic to cure for some period of time, on the order of about sixty seconds, the movable core 42 is then withdrawn to a retracted position shown in FIG. 3. At this time, a second molten plastic is injected in a continuous, closed loop bead into the mold 40 through one or more gates 48 proximate the first plastic 44 and proximate the periphery of the substrate. The second plastic preferably comprises a substance such as silicone or thermoplastic olefin (TPO). The second plastic must bond sufficiently to the substrate material during the molding process, while at the same time being sufficiently releasable in use from contact with sheet metal after the passage of several years or more. Another desirable feature of the second plastic is that it have a relatively soft, rubber-like feel such as material 3-8186 available from Dow Corning Corporation of Plymouth, Mich. and possibly described in U.S. Pat. No. 4,322,518, the disclosure of which is hereby incorporated by reference. Particular combinations of materials that work together are disclosed in U.S. Pat. No. 5,530,989 and U.S. Pat. No. 5,823,069, the disclosures of which are also hereby incorporated by reference.

The first plastic is then cooled to form the rigid plastic substrate 12 having a first durometer hardness at ambient temperature of at least about 84 Shore A, and most preferably about 104 Rockwell R. The second plastic is likewise cooled to form the sealing gasket 14, which has a second, softer durometer of about 10 to about 70, and most preferably about 20, Shore OO.

After the water shield cures, it is removed from the mold and normally inventoried. At the assembly point, the water shield 14 is mated to the door outer 16 in any conventional manner.

FIG. 4 shows an alternative method for making the water shield. The method comprises providing a rotary mold having a core side 60 and a cavity side 62. The core side 60 has a pair of cavities 64 and 66 having the general shape of the water shield 10. With the core side 60 in the position shown in FIG. 4, the cavity side 62 is brought into contact with the core side and the first plastic is injected into the cavity 64 to form the substrate 12. After the substrate cures, the cavity side 62 is retracted and core side 60 is retracted and rotated 180° as shown by the arrows. The cavity side 62 is then re-extended into contact with the core side 60, and the second plastic is then injected in the same way described above with respect to FIGS. 2 and 3. At the same time, a second shot of the first plastic is injected onto the cavity 66 to begin the process again. After the water shield cures, the finished part is ejected from the cavity 64 and the process repeated.

It should be understood that while the forms of the invention shown and described above constitute preferred embodiments of the invention, they are not intended to illustrate all possible forms thereof. For instance, the present invention may be used to form components of any close out system such as that between the trunk and passenger compartments, or the engine and passenger compartments, in a motor vehicle. It should also be understood that the words used are words of description rather than limitation, and various changes may be made without departing from the spirit and scope of the invention disclosed.

What is claimed is:

1. A method of making a water shield for a motor vehicle, the method comprising:

providing a mold having a cavity with the general shape of the water shield and also having a movable core;

injecting into the cavity a first plastic to form a substrate of the water shield;

withdrawing the core;

injecting a second plastic into the mold and proximate the first plastic to form a gasket of the water shield; and cooling the first and second plastics to form the substrate having a first durometer and to form the gasket having a second durometer softer than the first durometer.

2. The method of claim 1 wherein the water shield defines a periphery, and the step of injecting the second plastic comprises injecting the second plastic proximate the periphery.

3. The method of claim 1 wherein the water shield defines a periphery, and the step of injecting the second plastic comprises injecting the second plastic proximate the periphery to form a seal.

4. The method of claim 1 wherein the first plastic comprises thermoplastic.

5. The method of claim 1 wherein the first plastic comprises ABS.

6. The method of claim 1 further comprising waiting about sixty seconds after injecting the first plastic before injecting the second plastic.

7. The method of claim 1 wherein the first plastic has a hardness at ambient temperature of at least about 84 Shore A.

8. The method of claim 1 wherein the second plastic comprises silicone.

9. The method of claim 1 wherein the second plastic comprises TPO.

10. The method of claim 1 wherein the second plastic is injected in a continuous, closed loop bead.

11. A method of making a water shield for a motor vehicle, the method comprising:

providing a rotary mold having a cavity with the general shape of the water shield;

injecting into the cavity a first plastic to form a substrate of the water shield;

rotating the mold;

injecting a second plastic into the mold and proximate the first plastic to form a gasket of the water shield; and cooling the first and second plastics to form the substrate having a first durometer and to form the gasket having a second durometer softer than the first durometer.

12. The method of claim 11 wherein the water shield defines a periphery, and the step of injecting the second plastic comprises injecting the second plastic proximate the periphery.

13. The method of claim 11 wherein the water shield defines a periphery, and the step of injecting the second plastic comprises injecting the second plastic proximate the periphery to form a seal.

14. The method of claim 11 wherein the first plastic comprises thermoplastic.

15. The method of claim 11 wherein the first plastic comprises ABS.

16. The method of claim 11 further comprising waiting about sixty seconds after injecting the first plastic before injecting the second plastic.

17. The method of claim 11 wherein the first plastic has a hardness at ambient temperature of at least about 84 Shore A.

18. The method of claim 11 wherein the second plastic comprises silicone.

19. The method of claim 11 wherein the second plastic comprises TPO.

20. The method of claim 11 wherein the second plastic is injected in a continuous, closed loop bead.

21. A method of forming a motor vehicle door, the method comprising:

providing a mold having a cavity with the general shape of a water shield and also having a movable core;

injecting into the mold a first plastic to form a substrate of the water shield;

withdrawing the core;

injecting a second plastic in a continuous, closed loop bead into the mold and proximate the first plastic;

cooling the first and second plastics to form a substrate having a first durometer and to form a sealing gasket having a second durometer softer than the first durometer; and mating the water shield to a door outer.

22. The method of claim 21 wherein the water shield defines a periphery, and the step of injecting the second plastic comprises injecting the second plastic proximate the periphery.

23. The method of claim 21 wherein the water shield defines a periphery, and the step of injecting the second plastic comprises injecting the second plastic proximate the periphery to form a seal.

24. The method of claim 21 wherein the first plastic comprises thermoplastic.

25. The method of claim 21 wherein the first plastic comprises ABS.

26. The method of claim 21 further comprising waiting about sixty seconds after injecting the first plastic before injecting the second plastic.

27. The method of claim 21 wherein the first plastic has a hardness at ambient temperature of at least about 84 Shore A.

28. The method of claim 21 wherein the second plastic comprises silicone.

29. The method of claim 21 wherein the second plastic comprises TPO.

* * * * *